US011235345B2

(12) United States Patent
Feldhaus et al.

(10) Patent No.: US 11,235,345 B2
(45) Date of Patent: Feb. 1, 2022

(54) SPRAY PATTERN OF NOZZLE SYSTEMS

(71) Applicant: Deere & Company, Moline, IL (US)

(72) Inventors: Johannes Feldhaus, Königswinter (DE); Richard A. Humpal, Ankeny, IA (US); Dolly Y. Wu, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 178 days.

(21) Appl. No.: 16/587,947

(22) Filed: Sep. 30, 2019

(65) Prior Publication Data

US 2020/0023398 A1 Jan. 23, 2020

Related U.S. Application Data

(62) Division of application No. 15/188,703, filed on Jun. 21, 2016, now Pat. No. 10,441,965.

(60) Provisional application No. 62/182,928, filed on Jun. 22, 2015.

(51) Int. Cl.

| | |
|---|---|
| ***B05B 12/12*** | (2006.01) |
| ***A01M 7/00*** | (2006.01) |
| ***B05B 1/20*** | (2006.01) |
| ***B05B 13/00*** | (2006.01) |

(52) U.S. Cl.

CPC ......... *B05B 12/124* (2013.01); *A01M 7/0089* (2013.01); *B05B 1/20* (2013.01); *B05B 12/126* (2013.01); *B05B 13/005* (2013.01); *A01M 7/0053* (2013.01)

(58) Field of Classification Search

CPC ..... B05B 12/12; B05B 12/124; B05B 12/126; B05B 13/005; A01M 7/0053; A01M 7/0089

See application file for complete search history.

(56) References Cited

U.S. PATENT DOCUMENTS

| | | | |
|---|---|---|---|
| 6,522,948 | B1 | 2/2003 | Benneweis |
| 7,124,964 | B2 | 10/2006 | Bui |
| 8,760,303 | B2 | 6/2014 | Hillger et al. |
| 2003/0019949 | A1 | 1/2003 | Solie et al. |
| 2003/0111546 | A1 | 6/2003 | Schaffter et al. |

(Continued)

OTHER PUBLICATIONS

Holterman et al., "IDEFICS: a physical model of spray drift from boom sprayers in agriculture," specification, Jul. 6-8, 1998 (6 pages).

(Continued)

*Primary Examiner* — Alex M Valvis

(57) ABSTRACT

A system and method for dispersing fluids from an agricultural vehicle includes a sprayer that dispenses the fluids and a controller cooperative with a plurality of sensors to sense vehicle travel speed, vehicle travel direction, wind speed, wind direction, and the heights of first and second nozzles from the ground surface. The controller includes a memory storing a look-up table having fan angles of the first and second nozzles, and a processor that computes first and second spray pattern on the ground surface based on the fluid dispensed through the respective first and second nozzles. The processor determines an overlap region between the first and second spray patterns, compares the determined overlap region with a pre-determined overlap, and takes corrective action automatically by changing travel speed of the vehicle or changing a duration of time the fluids are dispensed from the first and second nozzles.

8 Claims, 19 Drawing Sheets

(56) References Cited

U.S. PATENT DOCUMENTS

| | | | |
|---|---|---|---|
| 2008/0230624 | A1 | 9/2008 | Giles et al. |
| 2009/0099737 | A1 | 4/2009 | Wendte et al. |
| 2009/0192654 | A1 | 7/2009 | Wendte et al. |
| 2013/0341419 | A1 | 12/2013 | Pfrenger et al. |
| 2014/0074360 | A1 | 3/2014 | Rosa et al. |
| 2015/0367358 | A1 | 12/2015 | Funseth et al. |

OTHER PUBLICATIONS

Kruckeberg, "An automated nozzle controller for self-propelled sprayers," graduate theses and dissertations, 2011, (181 pages).

Rear view of the actual spray path ( ---------- ) and the desired spray grid ( — — - - — — ).

Example spray pattern on the ground
under changing wind/travel conditions

Example, calculation of Overlap for spray pattern in the Ground.

Correcting for Or taking action For Spray pattern on the Ground.

Overlap and Spray pattern on the ground under changing wind/travel conditions.

Direction of travel

SPRAY PATTERN OF NOZZLE SYSTEMS

RELATED APPLICATIONS

This patent application is a division of U.S. patent application Ser. No. 15/188,703, filed Jun. 21, 2016 which claims priority to U.S. Provisional Patent Application Ser. No. 62/182,928, filed Jun. 22, 2015, and entitled, SPRAY PATTERN OF NOZZLE SYSTEMS, the contents of both of which are incorporated herein by reference. This patent application is related to U.S. patent application Ser. No. 14/506,057, filed Oct. 3, 2014, and entitled, HYBRID FLOW NOZZLE AND CONTROL SYSTEM, which claims priority to U.S. Provisional Patent Application Ser. No. 62/050,530, filed Sep. 15, 2014, and entitled, TIME VARYING CONTROL OF THE OPERATION OF SPRAY SYSTEMS, and to U.S. Provisional Patent Application Ser. No. 62/015,315, filed Jun. 20, 2014, and entitled, HYBRID FLOW NOZZLE AND CONTROL SYSTEM, the contents of all of which are incorporated herein by reference.

FIELD OF THE DISCLOSURE

This disclosure relates generally to the control and design of liquid or granular spraying systems based on the spray pattern in a target area, field or ground.

BACKGROUND OF THE DISCLOSURE

In the agricultural industry, sprayers provide liquid nutrients, fertilizer, herbicides, and water to plants, crops, trees, and other vegetation. Sometimes too much liquid is sprayed and the crops may grow poorly or even drown from root rot. If there is insufficient spraying, the crops may not mature, the yield is lower, and money, time and resources are again wasted. Also, if a chemical may have harmful consequences, then over-spraying may create more harm, plus money is wasted in paying for extra chemicals. Other variables include vehicle speed, wind and spray drift effects that may cause the spray to drift past the boundaries of the field and land on neighboring crops or houses.

Nozzles may be either continuous spray or pulse mode spray so that the spray pattern on the ground may not be the same, but both modes of spraying can generate uneven spray patterns on the ground. The controller system for the fluid may release the fluid continuously or send periodic signals such as a pulse-width modulated (PWM) signal to release the fluid. In many settings, not just a single but multiple nozzles are used together. Sprayer systems have multiple nozzle bodies or outlets to apply liquids over a large or intricate surface area. Sometimes the activity of more than one hundred nozzles is coordinated, which makes PWM control complex.

Instead of liquids being sprayed, granular solid fertilizer or other chemicals may also be sprayed (broadcasted) out of long nozzle tubes onto the ground. The wind or vehicle travel speed may be such that finer grains of solid fertilizer or other chemicals would swirl and drift and may behave similarly to liquid droplets.

SUMMARY OF THE DISCLOSURE

Some embodiments include a system configured to disperse fluids or fine granular particles from an agricultural vehicle. The system includes a sprayer configured to dispense the fluids or fine granular particles; and a controller cooperative with a plurality of sensors to sense vehicle travel speed, vehicle travel direction, wind speed, wind direction, a height of a first nozzle from a ground surface, and a height of a second nozzle from the ground surface. The controller includes a memory storing a look-up table having fan angles of the first and second nozzles, and a processor configured to compute a first spray pattern on the ground surface based on the fluid dispensed through the first nozzle. The processor is also configured to compute a second spray pattern on the ground surface based on the fluid dispensed through the second nozzle, and to determine an overlap region between the first spray pattern and the second spray pattern. The processor is configured to compare the determined overlap region with a pre-determined overlap, and take corrective action automatically by performing at least one of the following actions: changing travel speed of the vehicle and changing a duration of time the fluids or fine granular particles are dispensed from the first and second nozzles.

Some embodiments include a method of dispersing fluids or fine granular particles from an agricultural vehicle. The method includes dispensing the fluids or fine granular particles through a first nozzle and a second nozzle, and sensing at least one of vehicle travel speed, vehicle travel direction, wind speed, wind direction, a first height of the first nozzle from a ground surface, and a second height of the second nozzle from the ground surface. The method further includes computing, with a processor, a first spray pattern on the ground surface based on the fluids or fine granular particles dispensed through the first nozzle, and computing, with the processor, a second spray pattern on the ground surface based on the fluids or fine granular particles dispensed through the second nozzle. The method further includes determining, with the processor, an overlap region between the first spray pattern and the second spray pattern, comparing, with a processor, the determined overlap region with a pre-determined overlap, and taking corrective action automatically by performing at least one of the following actions with the processor: changing the vehicle travel speed and changing a duration of time the fluids or fine granular particles are dispensed from at least one of the first nozzle and the second nozzle.

Some embodiments include a system configured to disperse fluids or fine granular particles in a field from an agricultural vehicle. The system includes a sprayer configured to dispense the fluids or fine granular particles, and a controller cooperative with a plurality of sensors to sense vehicle travel speed, vehicle travel direction, wind speed, wind direction, a height of a first nozzle from a ground surface, and a height of a second nozzle from the ground surface. The controller includes a memory storing a look-up table having fan angles of the first and second nozzles. The controller further includes a processor configured to compute a first spray pattern on the ground surface based on the fluid dispensed through the first nozzle during a first pass through the field, compute a second spray pattern on the ground surface based on the fluid dispensed through the second nozzle during the first pass through the field, and determine a first overlap region between the first spray pattern and the second spray pattern. The controller is configured to compare the first overlap region with a pre-determined overlap and take corrective action automatically by performing at least one of the following actions: changing travel speed of the vehicle and changing a duration of time the fluids or fine granular particles are dispensed from the nozzle. The controller is further configured to compute a third spray pattern on the ground surface based on the fluid dispensed through the first nozzle during a second pass through the field, the second pass adjacent to the first pass, compute a fourth spray pattern on the ground surface based on the fluid dispensed through the second nozzle during the second pass through the field, determine a second overlap region between the third spray pattern and the fourth spray pattern, and compare the second overlap region with a pre-determined overlap. The controller is further configured to determine a third overlap region between the first and second spray patterns and the third and fourth spray patterns, compare the third overlap region with a pre-determined overlap, and take corrective action automatically by performing at least one of the following actions: changing travel speed of the vehicle and changing a duration of time the fluids or fine granular particles are dispensed from the nozzle.

Various aspects of example embodiments are set out below and in the claims. Embodiments include a sprayer system having dynamic monitoring or prediction of the spray pattern on the ground (or target area) such as the overlap or drift of spray patterns produced during operation of an agricultural vehicle in a crop field. The predicted or monitored pattern on the ground is compared with a desired pattern in a desired grid. If the desired ground pattern is not occurring, then corrective or counter-balancing action is taken. For example, when there are multiple sprayers, adjacent or near neighboring nozzle bodies and their spray overlap patterns are determined together. As the sprayer moves forward, the overlap of the ground patterns is determined in the direction of travel. These overlap calculations are corrected based on the type of nozzle heads used, the type of spray (continuous or pulsed), travel speed, external conditions, and so on. Adaptive action is taken to optimize uniformity of spray, location of spray or drift and so on. Other operation modes, features and embodiments are disclosed in the detailed description, accompanying drawings and claims.

BRIEF DESCRIPTION OF THE DRAWINGS

The detailed description refers to the following example figures.

DETAILED DESCRIPTION

Figure 1:
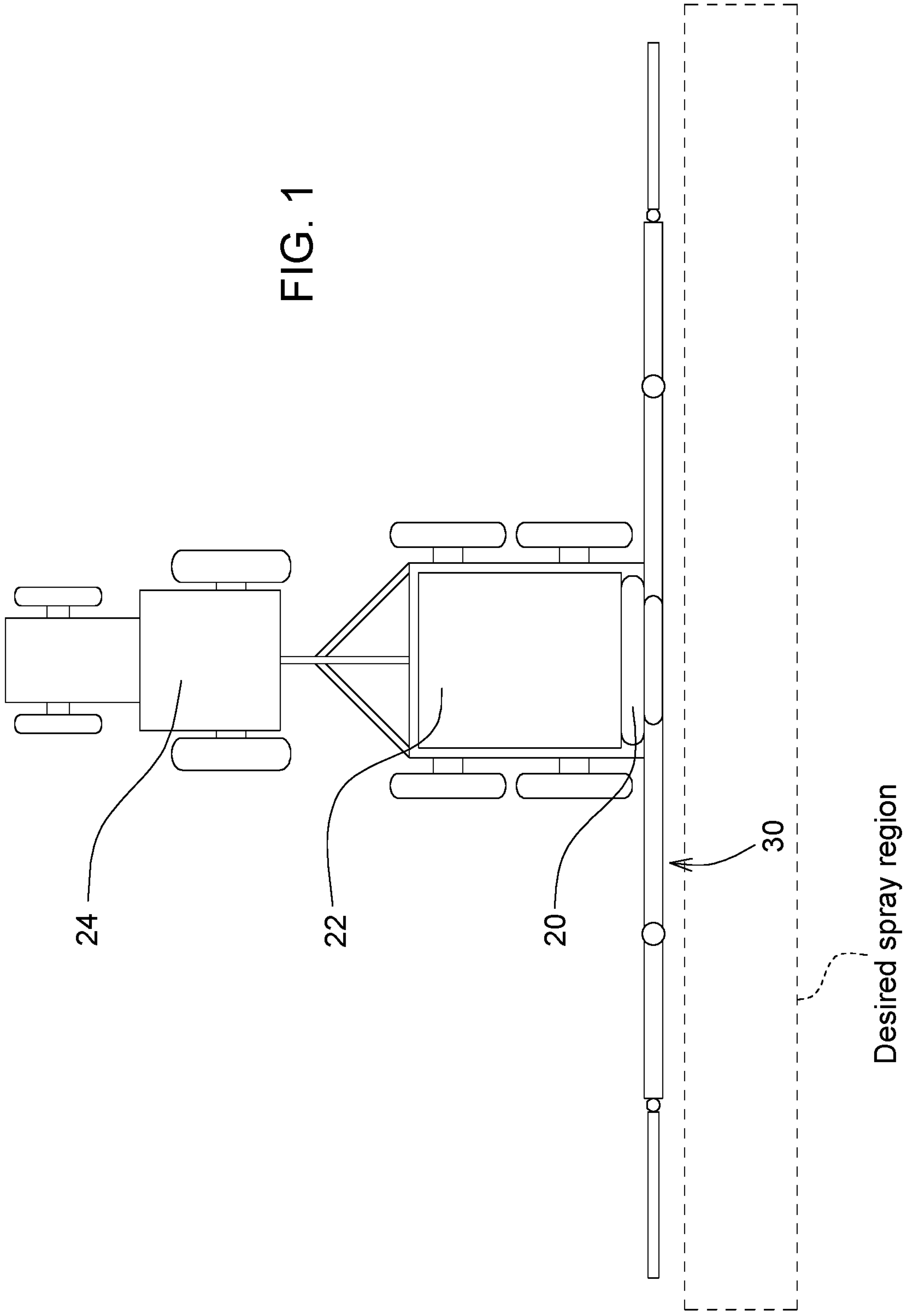
FIG. 1 depicts an example agricultural vehicle carrying or towing a sprayer boom on which example nozzles are mounted.

Disclosed embodiments focus on determining whether fluid spray or fine granular particles land in a desired region behind an agricultural vehicle (e.g. self-propelled sprayer, tractor or dry spreader). The determination is based on either a spray detector mounted behind the spray boom, or on a predictive model based on spray model (e.g. AGDISP plume model or spray drift model), or on a predictive trigonometric model. The computational processing circuits are mounted on a controller mounted on the spray boom or center frame behind the sprayer vehicle. For the predictive models such as AGDISP, a lookup table and a small amount of dynamic computation are used to predict where the spray is landing on the ground. Variables such as the spray nozzle properties (e.g. type of nozzle, nozzle tip, spray cone, fan angle), the atmospheric conditions (wind, air pressure, humidity, temperature, etc.), vehicle speed/direction, terrain (hills and angle), spray pressure, fluid flow rate and other conditions are used to feed into the lookup table and geometric calculation (e.g. height of spray boom or height of the nozzles, length of the boom, dip angle of the boom) to determine the amount and location of the spray on the ground. A lower fluid pressure and/or higher flow rate results in coarser droplets, whereas higher fluid pressure and/or lower flow rate results in finer droplets. Typically, smaller droplets are more prone to drift.

Alternatively, when the spray droplet size or the size of the granular particles are above a certain size to more or less ensure ideal spray/spread conditions, the predictive trigonometric model, a small lookup table and dynamic computation are used to predict where the spray is approximately landing on the ground. The spray nozzle properties (e.g. type of nozzle, nozzle tip, spray cone, fan angle), geometry (e.g. height of the boom or nozzles), speed/direction of the vehicle, location of the vehicle (e.g. GPS, RTK), and wind speed/direction are considered in the calculation. For instance a spray cone and ground spray spot is determined; the angle from vertical of the central vertical axis of the cone is adjusted based on the vehicle travel speed/direction and the wind speed/direction. With either predictive calculation model (e.g. AGDSIP or trigonometric), the spray from every single nozzle is computed in order to predict side to side fluid spray overlap/skips or to predict forward-aft overlap/skips. If only the spray drift past a safe or buffer zone is desired, then assessment of the corner (far ends of the boom) spray is generally sufficient (e.g. spray from the last boom section or last few nozzles). The location of the vehicle is compared with the location of the buffer zone or of the boundary of the farm field to check whether the spray is drifting past desired grid area. When the spray goes past the buffer zone, the relevant nozzles may be turned off or the pointing direction of the spray nozzles is adjusted, or the height of the boom is lowered, etc. The buffer zone can be defined by boundaries having any suitable shape based upon the geometry of the field and any obstacles or no-spray zones.

The predictive ground spray calculations or detected spray on the ground from each nozzle can be aggregated to determine an actual spray area occurring on the ground from the nozzles, collectively. By taking into account of all the spray from each nozzle, then it is possible to calculate the amount of spray overlap either side to side or spray overlap in the fore-aft direction in the back of the direction of travel (behind the vehicle). When the overlap exceeds a certain amount indicating that the spray pattern is not uniform, the sprayer system takes correction action. For example, the PWM frequency is increased or the sprayer is slowed down, pointing direction of the nozzles, the nozzle angle, boom angle, and/or boom height, etc., is adjusted.

FIG. 1 depicts an example of many nozzles mounted on or clamped to a fluid distribution pipe that attaches to a boom assembly 30 that is in turn mounted on a dolly platform 20 that supports a fluid tank 22 and is connected to a tractor 24.

Figure 1A:
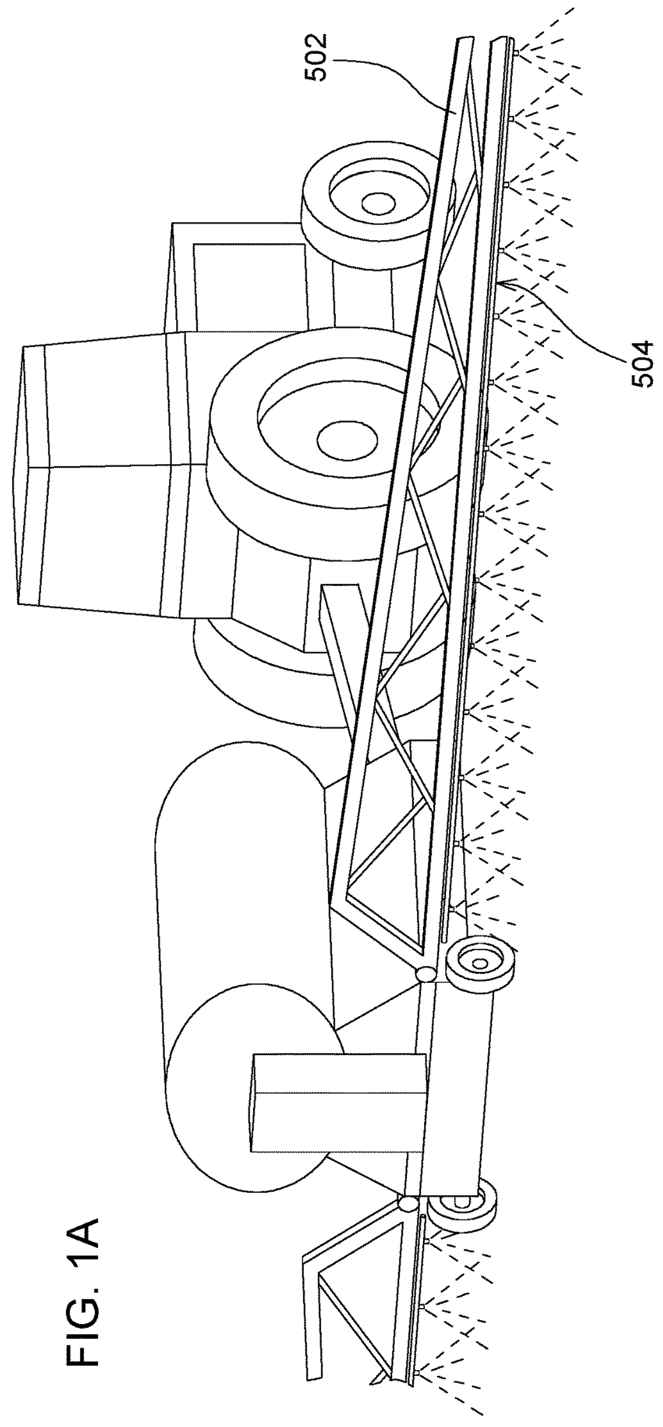
FIG. 1A depicts an example spray pattern from the nozzles behind the agricultural vehicle of FIG. 1, where the spray pattern from each nozzle overlaps with that from an adjacent or side-to-side nozzle.

FIG. 1A depicts an example spray pattern from the nozzles behind the agricultural vehicle of FIG. 1, where the spray pattern from each nozzle overlaps somewhat with that from an adjacent or side-to-side nozzle. The fluid distribution pipe 504 that carries the fluid is mounted externally (e.g. under or behind or ahead of) to or internally to a boom 502 of the boom assembly 30.

Figure 1E:
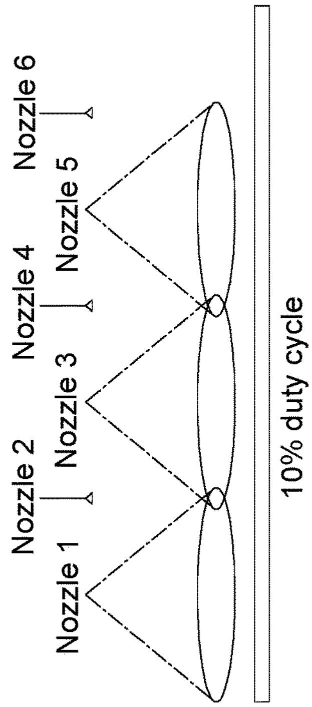
FIG. 1E depicts the operation of the nozzles during a 10% duty cycle.
Figure 1F:
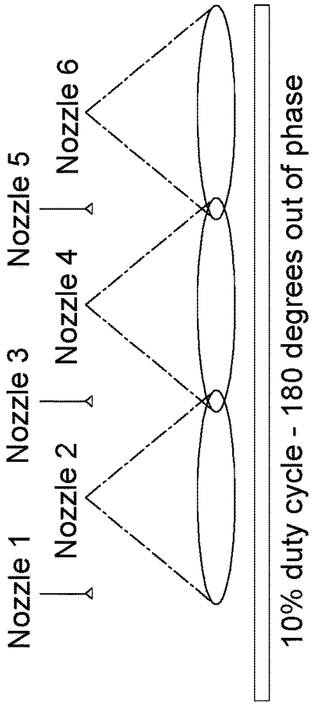
FIG. 1F depicts the nozzles of FIG. 1E during the 10% duty cycle by 180 degrees out of phase.
Figure 1B:
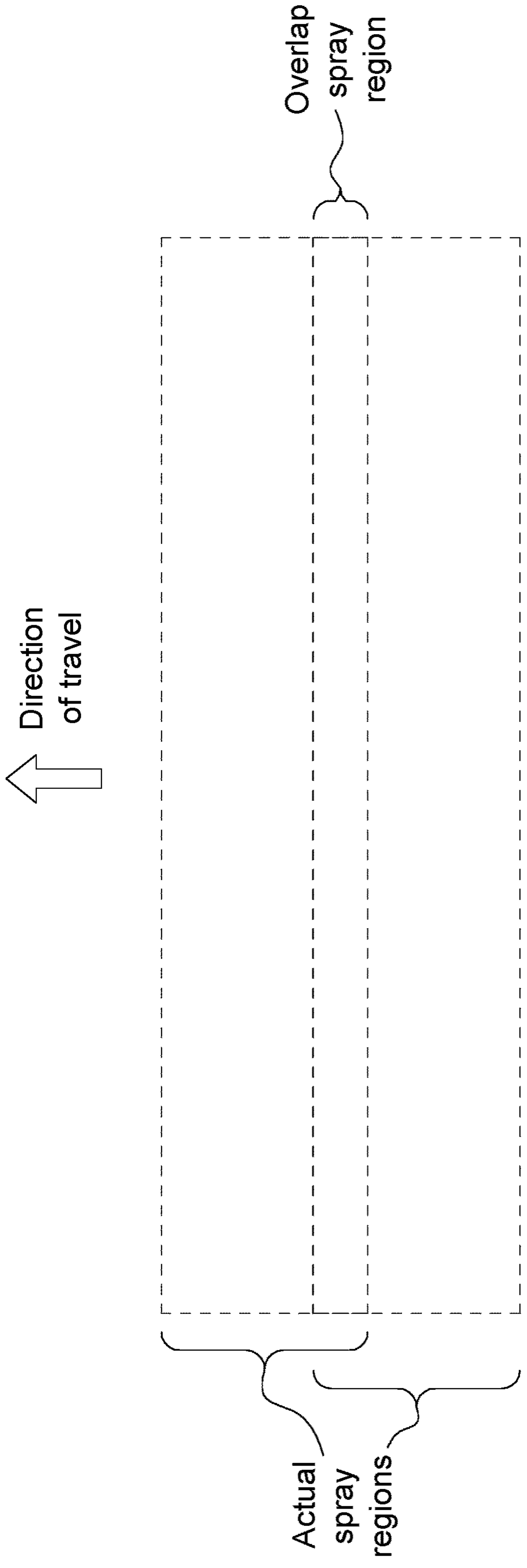
FIG. 1B depicts a forward-aft example of a spray pattern where the pattern overlaps.

FIG. 1B depicts a forward-aft example of an actual spray pattern where the pattern overlaps. If the overlap is a little, not much fluid is wasted. If the overlap were 50%, then approximately double the amount of fluid is deposited. If the overlap were somewhere between 0% and 50% or more than 50%, then the amount of spray or granular particles are not deposited uniformly. Some of the crops are over sprayed and the rest of the crops may be under-sprayed or sprayed the correct amount.

Figure 1C:
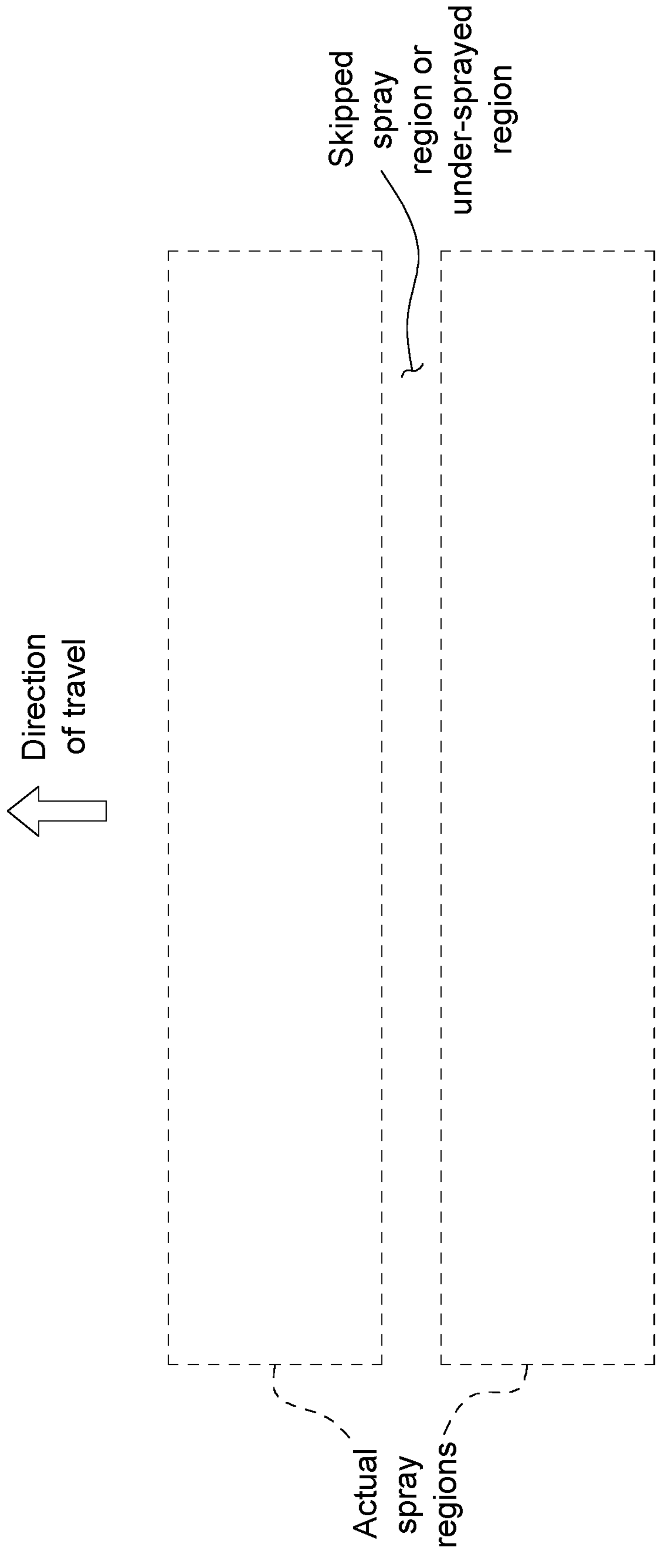
FIG. 1C depicts a forward-aft example of a spray pattern where the pattern skips.

FIG. 1C depicts a forward-aft example of an actual spray pattern where the pattern skips because the deposited chemicals do not overlap. Some of the crops do not get any chemicals.

Figure 1D:
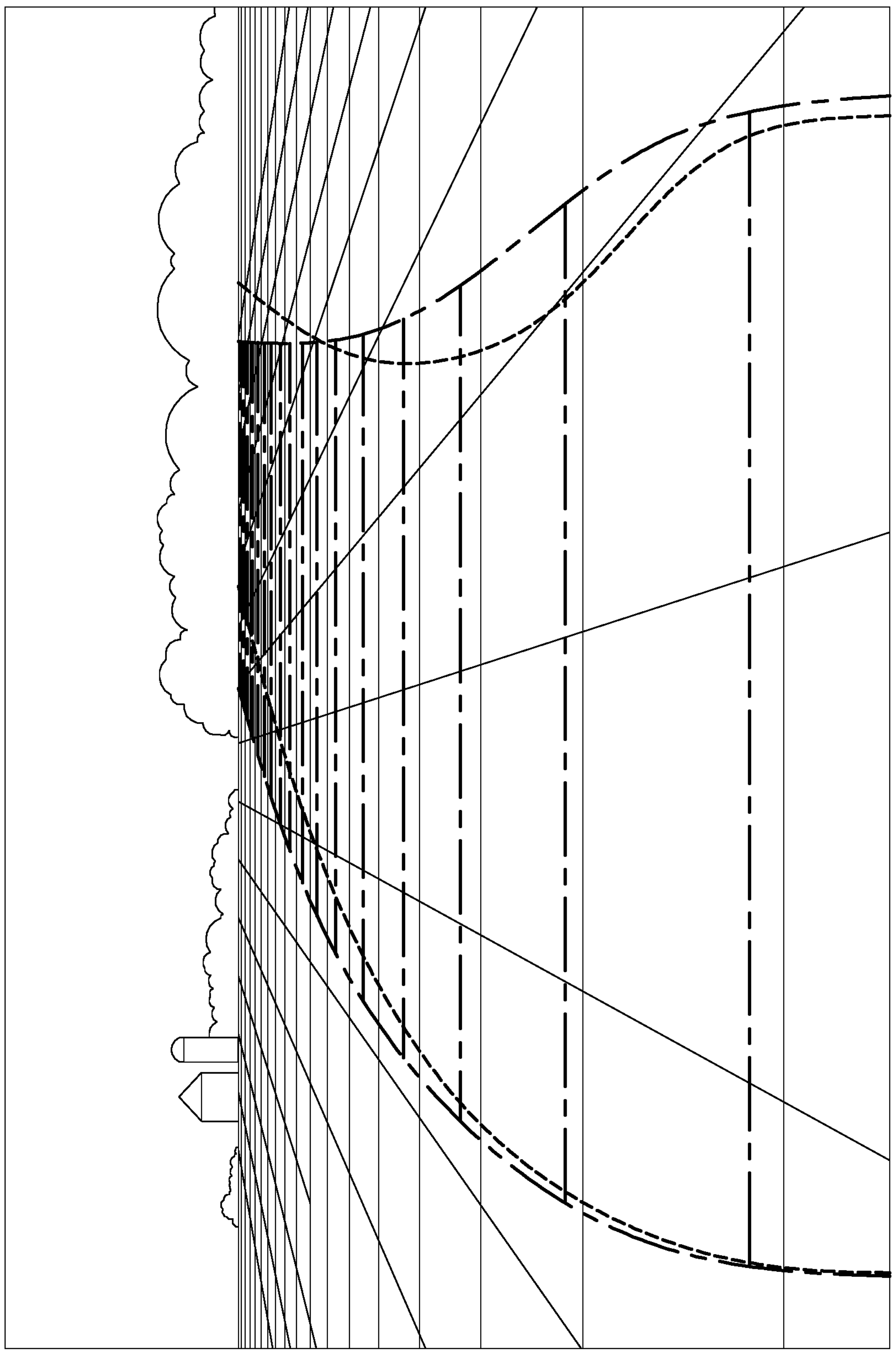
FIG. 1D depicts a rear view of the desired spray area grids and the actual spray path occurring on the ground or predicted spray path occurring on the ground.
Figure 2B:
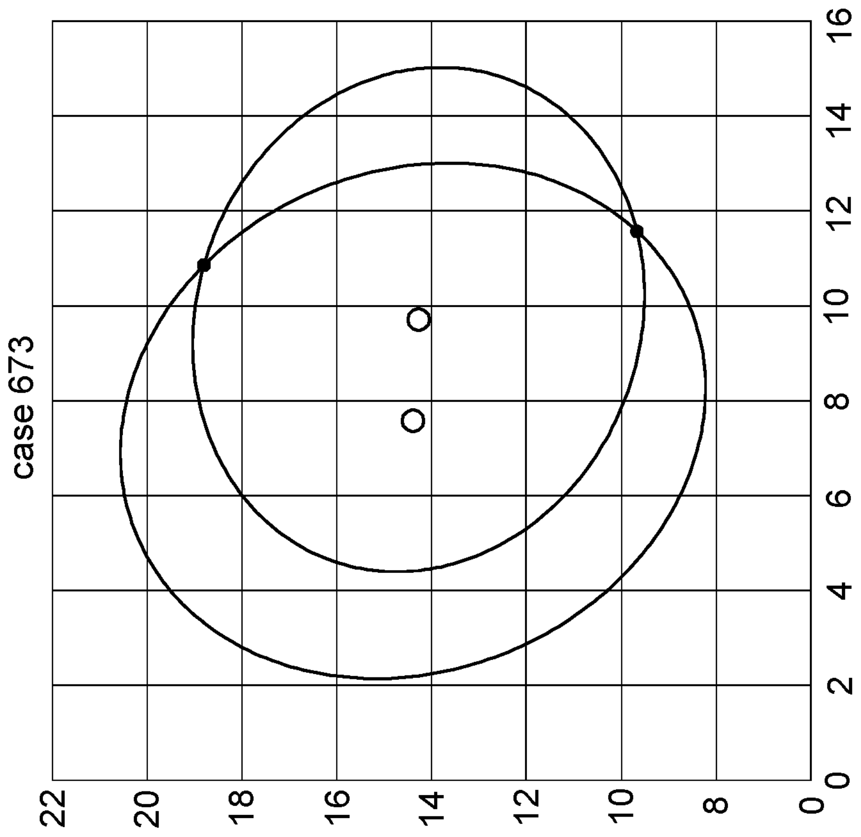
FIGS. 2A and 2B depict example systems governing multiple nozzles.
Figure 2A:
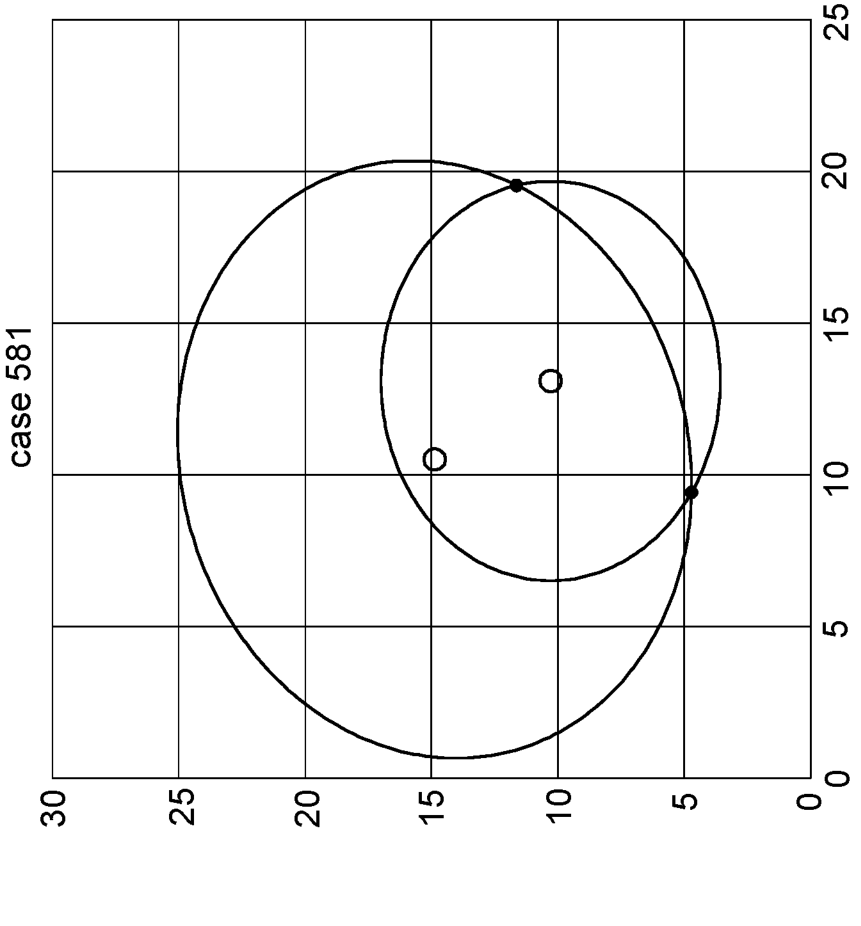

FIG. 1D depicts a rear view of the desired spray area grids and the actual spray path occurring on the ground or predicted spray path occurring on the ground.

FIGS. 1E and 1F depict six nozzles during a 10% duty cycle. FIG. 1F is 180 degrees out of phase of FIG. 1E. Other configurations and operations are possible and FIGS. 1E and 1F are given by way of example only.

The spray actually occurring on the ground is detected by a combination of sensors and visual indicators (e.g. camera image). Alternatively, the plume models or spray drift models are used. Such models, e.g. AGDISP, are described in various university publications or in research literature from the USDA. By contrast, FIGS. 2A-4C correspond to using the trigonometric method of computing a predicted spray that is occurring on the ground for each nozzle. The aggregate effect of all the nozzles spray calculations are shown in FIGS. 5-8B depending on the type of nozzle tips that are used, speed of the vehicle, etc. The details are described down below in this Disclosure. Once the ground area spray results are detected or determined, numerous corrective actions may be taken if the detected/determined results are not sufficiently close (e.g. within 90 to 95%) to the desired spray area on the ground.

Figure 9:
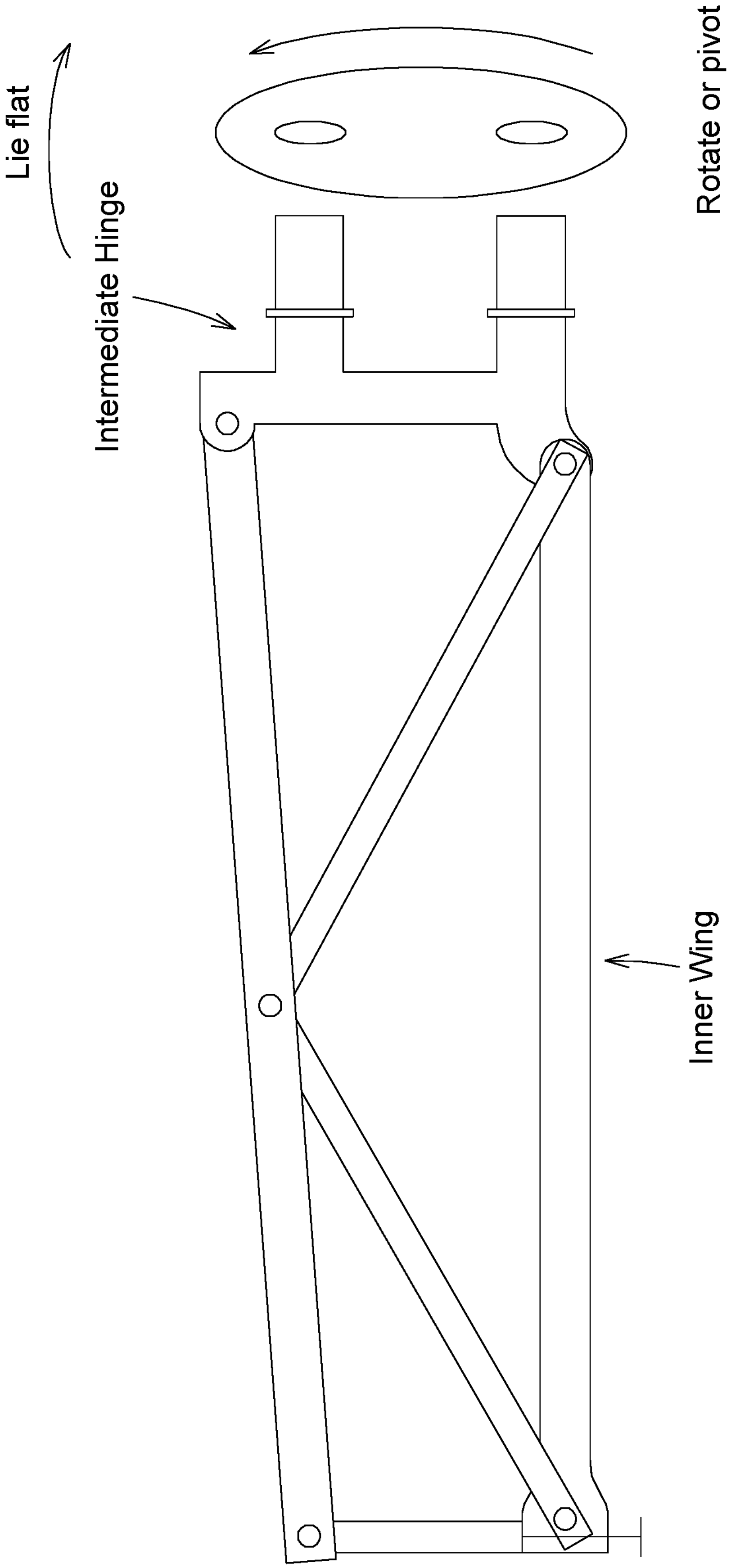
FIG. 9 depicts an example spray boom that tilts or rotates, which changes the trajectory of fluid released from the spray nozzles.

The following are example actions to counter-balance fluid release that is not yielding a desired ground spray pattern or not occurring in a desired spray cone or desired spray grid. For instance, FIG. 9 depicts an example spray boom that tilts or rotates, which changes the trajectory of fluid released from the spray nozzles.

Figure 10:
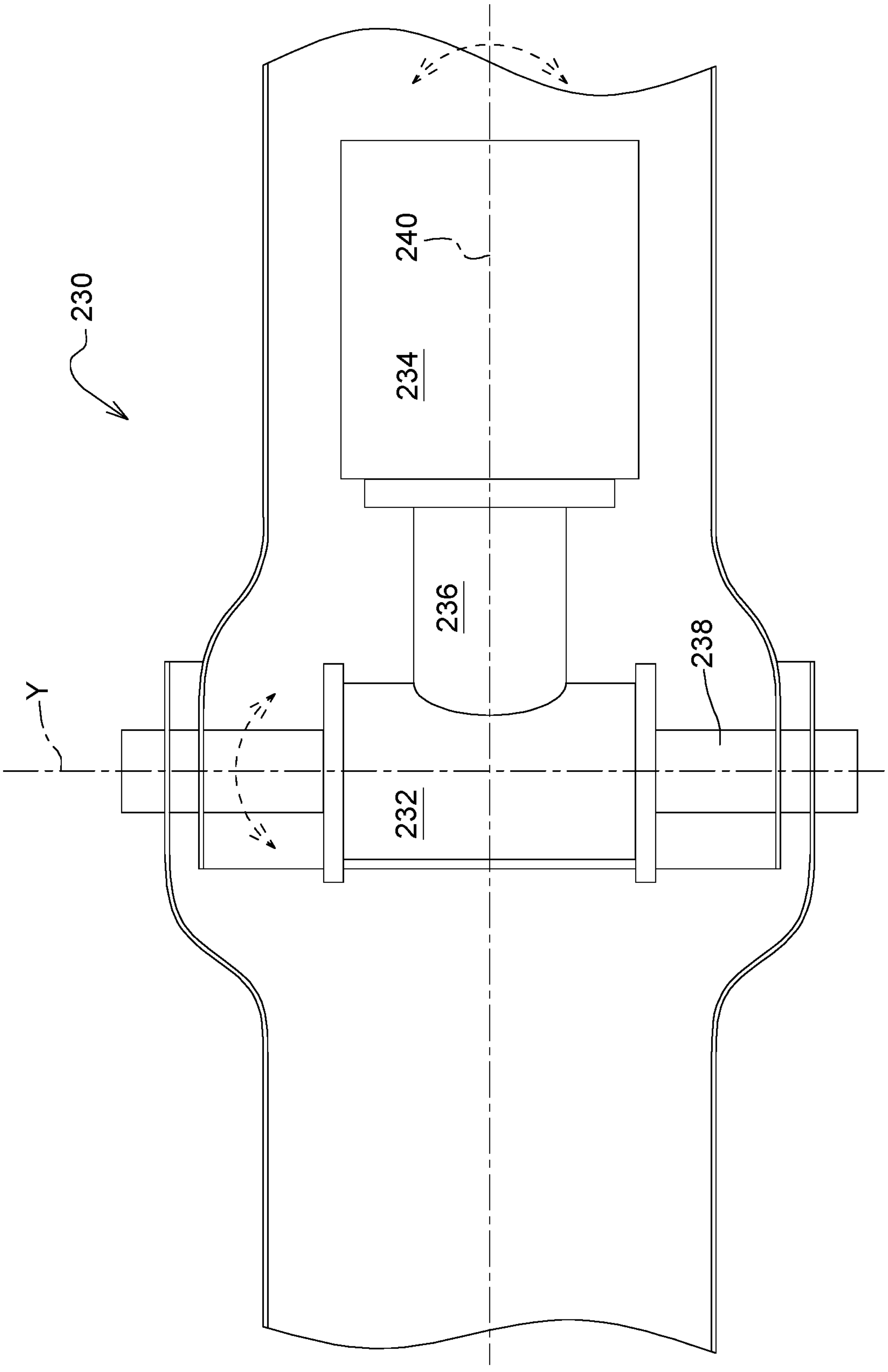
FIG. 10 depicts an example spray boom section that rotates, which changes the trajectory of fluid released from the spray nozzles.

FIG. 10 depicts an example spray boom section 230 that is rotatable about axis Y, which changes the trajectory of fluid released from the spray nozzles. For example, when the forward-moving vehicle or wind causes spray to go past the boundaries of a desired region, the boom and thus the spray nozzles are rotated to point more in the direction opposite the direction of the wind. FIG. 10 includes a motorized gear 232 controlled by an electric motor (inside 232), lightweight if the rest of the boom is made of light-weight materials (e.g. aluminum, fiber or composite fiber). The motorized gear 232 is mounted to or fits within the ends of a boom section and is anchored to the boom material by pin connectors 238 and adhesive. In the example of FIG. 10, the gear 232 enables rotation about the vertical axis Y; the rotation about the Y axis allows pivotal forward or rearward motion between the boom sections such as those shown in FIG. 8A-9. Motor 234 and gear 236 enable rotation about the horizontal axis 240 for a wing section to the right of the figure (not shown).

Figure 11:
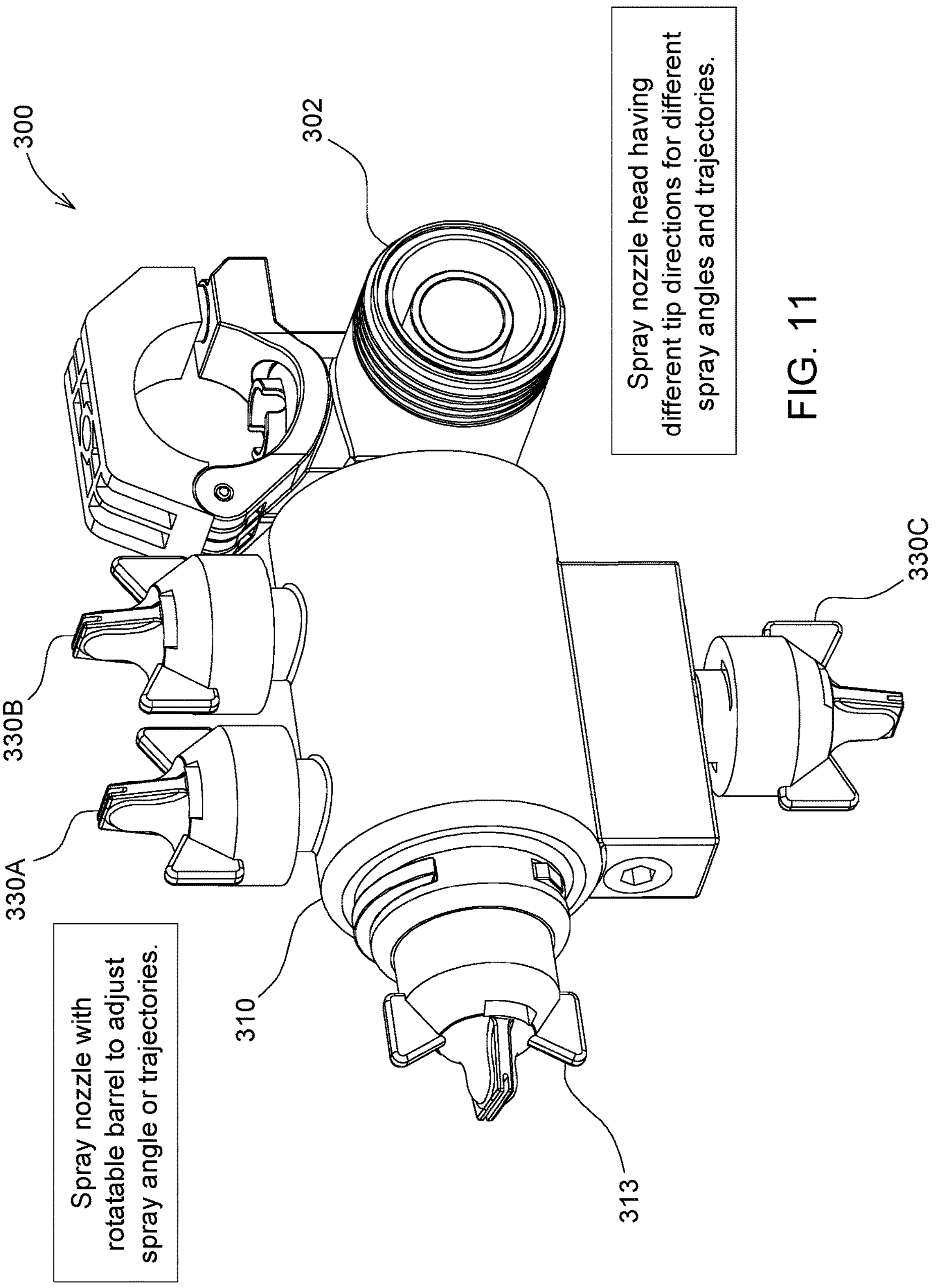
FIG. 11 depicts an example spray nozzle that allows different spray trajectories.

FIG. 11 depicts an example spray nozzle 300 that enables different spray trajectories. When the spray pattern on the ground has gone past the borders of the desired ground region, some of the nozzle tips are turned off if they have gone past the boundary. Spray is released only from the nozzle tips that have predicted spray cones and ground spray patterns that still land within the desired grid region. If skipping or spotty spray is occurring, then the nozzle tips that would eject fluid in the spotty region are turned on to increase coverage. For example, nozzle outlet tip 313 has a different release trajectory that should cover a different target spray area than nozzle outlet tips 330A, 330B, 330C would. In addition, a barrel 310 of spray nozzle 300 is rotatable, even remotely electronically controlled, so that more fluid (e.g. 2 outlet tips) or less fluid (e.g. 1 outlet tip) can be released. If desired, connection 302 can be fluidly coupled to an additional nozzle or fluidly coupled to the fluid flow through the boom.

In some embodiments, different spray nozzle tips can be utilized along a length of the boom. For example, each of the spray nozzles is controlled automatically by a processor and therefore, each of the spray nozzles can use the same or different tip as an adjacent nozzle. The processor is capable of configuring each of the individual nozzles to spray over the desired area.

Figure 12:
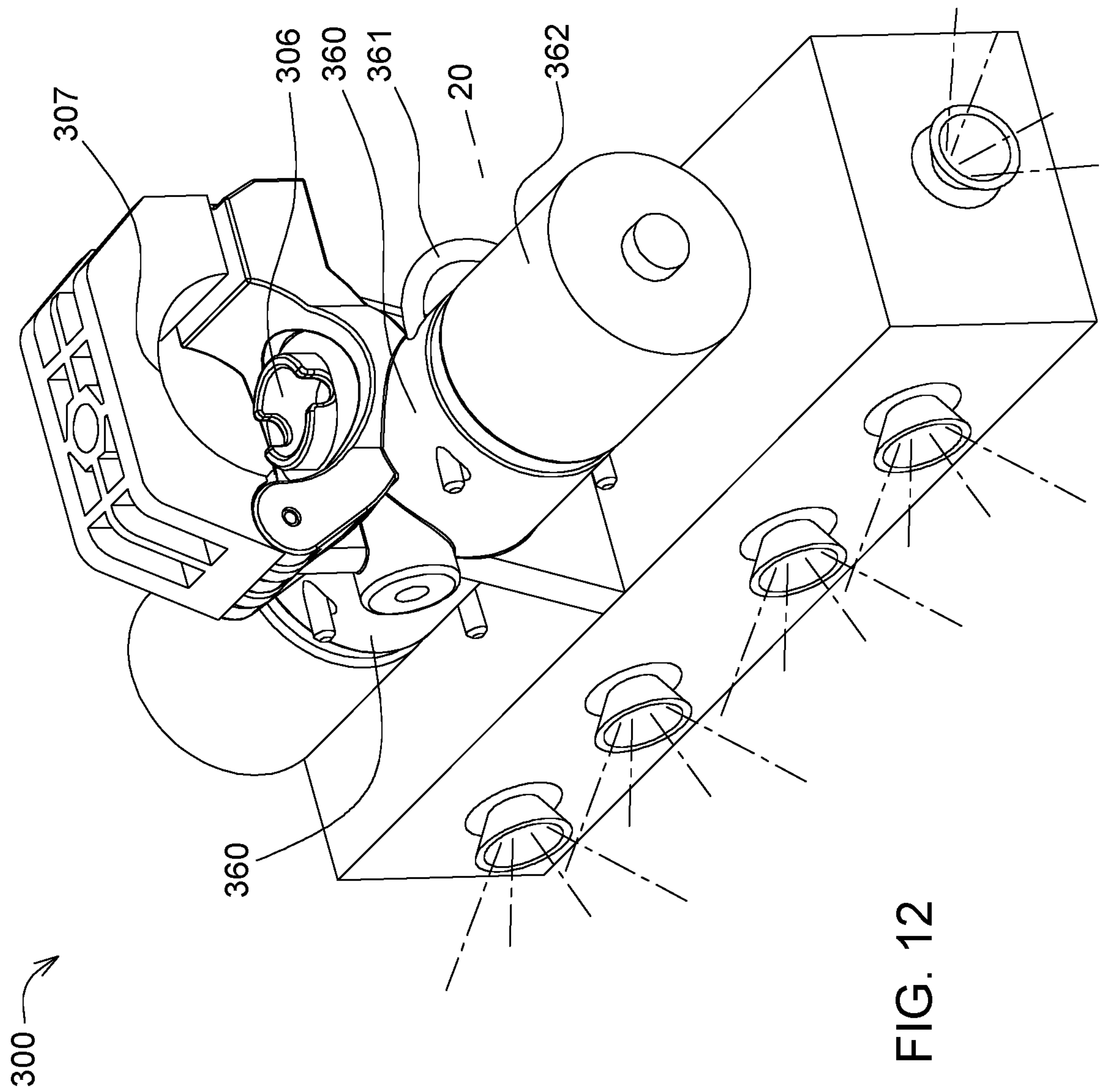
FIG. 12 depicts another example spray nozzle that allows different spray trajectories.

FIG. 12 depicts another example spray nozzle that includes fluid outlets with different spray trajectories. When the spray pattern on the ground has gone past the borders of the desired ground region or desired cone target area, some of the nozzle tips are turned off if they have gone past the boundary. Spray is released only from the nozzle tips that have predicted spray cones and ground spray patterns that still land within the desired cone or grid region.

In the embodiments of FIGS. 11 and 12, further adjustments to the spray pattern include changing the spray droplet size (e.g. adjusting flow rate by reducing or widening the opening of the release valves) or changing the fluid pressure. If the nozzles are under PWM signal control, the width of the PWM signal or the frequency can also be adjusted to release fluid faster to avoid spray pattern skips or to release fluid slower to avoid drowning the plants.

Figure 13:
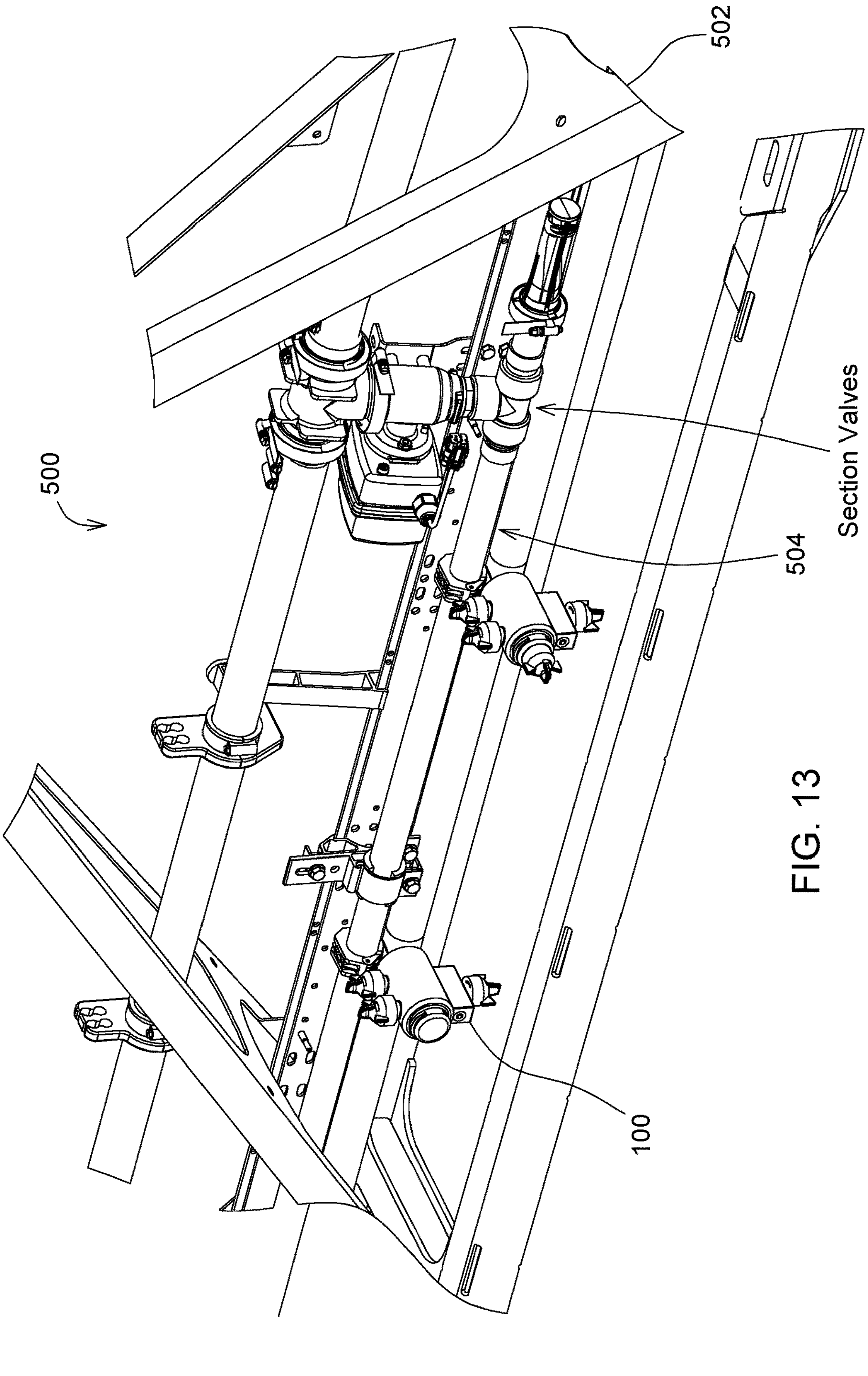
FIG. 13 depict an example spray boom with nozzles and section valves.

FIG. 13 depicts an example spray boom 500 having a fluid distribution pipe 504 with nozzles 100 and section valves. When the spray pattern on the ground has gone past the borders of the desired region, some of the nozzles are turned off or if much of the spray has gone past the boundary, a section valve can turn off an entire wing or section of a spray boom so that no further spray is released past the boundary region. The spray nozzles are also individually controllable so that the pointing direction of the spray nozzles changes. When the wind or vehicle travel is detected to be a certain direction, certain tips on the spray nozzle are opened/closed or the pointing direction of the spray nozzles are individually adjusted to counter-balance the effect of the wind or apparent wind due to the moving vehicle. For example, if the spray is found to drift past a buffer region, the spray nozzles may be rotated to point away from the buffer region. Or the spray from the tips that point toward the buffer zone is turned off. Another alternative is that the sections of the boom hovering near the buffer zone are turned off either at the section valves or on an individual nozzle basis. If the terrain is changing or hilly, another corrective method is to fold the end sections of the articulated boom, e.g. folding from the extended field position to a partial transport position.

Determining the overlap of spray from the nozzles or spreader nozzle heads can be more complex. For adjacent situations, the overlap is calculated in order to decide whether to increase spray pressure, switch nozzle tips, turn on/off nozzle tips, and/or change the pointing direction of the spray nozzle and so on. For forward-aft situations in the direction of travel, with pulsed spraying, skips in the spray pattern are reduced by proper consideration of overlaps; i.e. if overlap is zero and the patterns are far apart, then skipping has occurred and the vehicle should slow down or the pulse frequency or pulse width should increase. The example embodiments include electronically wired or wirelessly controlled sprayer systems. Not only PWM controlled spray nozzles release fluid that may generate uneven spray patterns on the ground, but continuously spraying nozzles can also do the same. For example, as the fluid pressure or terrain changes or the wind direction shifts or there is higher speed wind or less wind, the released fluids from the continuously spraying nozzles will also shift direction so that the spray pattern on the ground is patchy, uneven or not uniform.

In some versions of the system, overlap calculation is performed when taking into consideration spray drift or vehicle operation modes (e.g. turning or changing lanes). In addition, border problems, spraying past a boundary can also be addressed by the methods described herein.

When the spray overlap occurring on the ground is more than a desired amount (e.g. more than 5% overlap of the ground patterns), lowering the height of the boom is another alternative embodiment. Alternatively, every other nozzle body or every other nozzle tip on a nozzle body may be turned off. Another alternative is to adjust the pressure of the fluid.

When there is hilly ground, the overlap calculation includes a "hill" effect due because there is a height variable that accounts for the height differences of the nozzle tips to the surface of the ground directly below each nozzle tip. When the spray overlap occurring on the ground is more than a desired amount (e.g. more than 5% overlap of the ground patterns), some of the aforementioned methods are used (e.g. lower boom height). Alternatively, the pointing direction of a nozzle body is adjusted. The pointing direction is then included in a subsequent calculation of the spray pattern occurring on the ground.

Key Parameters, and Whether Skipping has Occurred:

One useful consideration is that a horizontal slice of a cone preserves the fan angle for either an up-right cone or a leaning cone. All of the fan angles for each nozzle type can be stored into the computer memory so that the value may be recalled once a nozzle type is keyed into the system.

There are two parameters of a cone that determine the spray area occurring on the ground: the height of the cone (or distance h from the nozzle tip to the ground), which is readily known based off of the boom height on a sprayer and a fan angle φ. A particular type of nozzle tip generates a particular pattern such as a cone, which is characterized by its fan angle φ (see FIG. 4*a*). Then, the radius of the circle on the ground, at distance h from the nozzle tip is given by:

$$\text{Radius } R = h \times \tan(\varphi)$$

This radius R is useful when calculating distances in one dimension so as to compare it with the distance of travel within a time T. Speed=Distance/Time may be used to compute a linear value whether the Distance traveled is greater than the size of R. If Distance is greater than R, skipping occurred. Corrective action includes slowing down the vehicle or spraying longer duration (ON mode is longer) or spraying faster.

To take into account the wind or vehicle travel speed (relative wind), the area on the ground is calculated by transforming the coordinates from the stationary frame (as if the spray were occurring when there is no wind and the vehicle is stopped) to the moving frame. For example, a circle on the ground becomes elongated like an ellipse after the coordinate transformation.

Pulsed Spraying, Circular Spray Pattern, Over or Under Spraying, or Uniform Spraying:

This is a straightforward situation that may occur when the wind and direction of travel of the spray vehicle cancels each other and the nozzle operates in pulse mode. A nozzle spray tip ejects a conical spray during the ON state (e.g. ON mode) of the pulse and the spray pattern is ejected out for the duration of the ON state and the vehicle has not traveled much during the ON state.

Figure 3A:
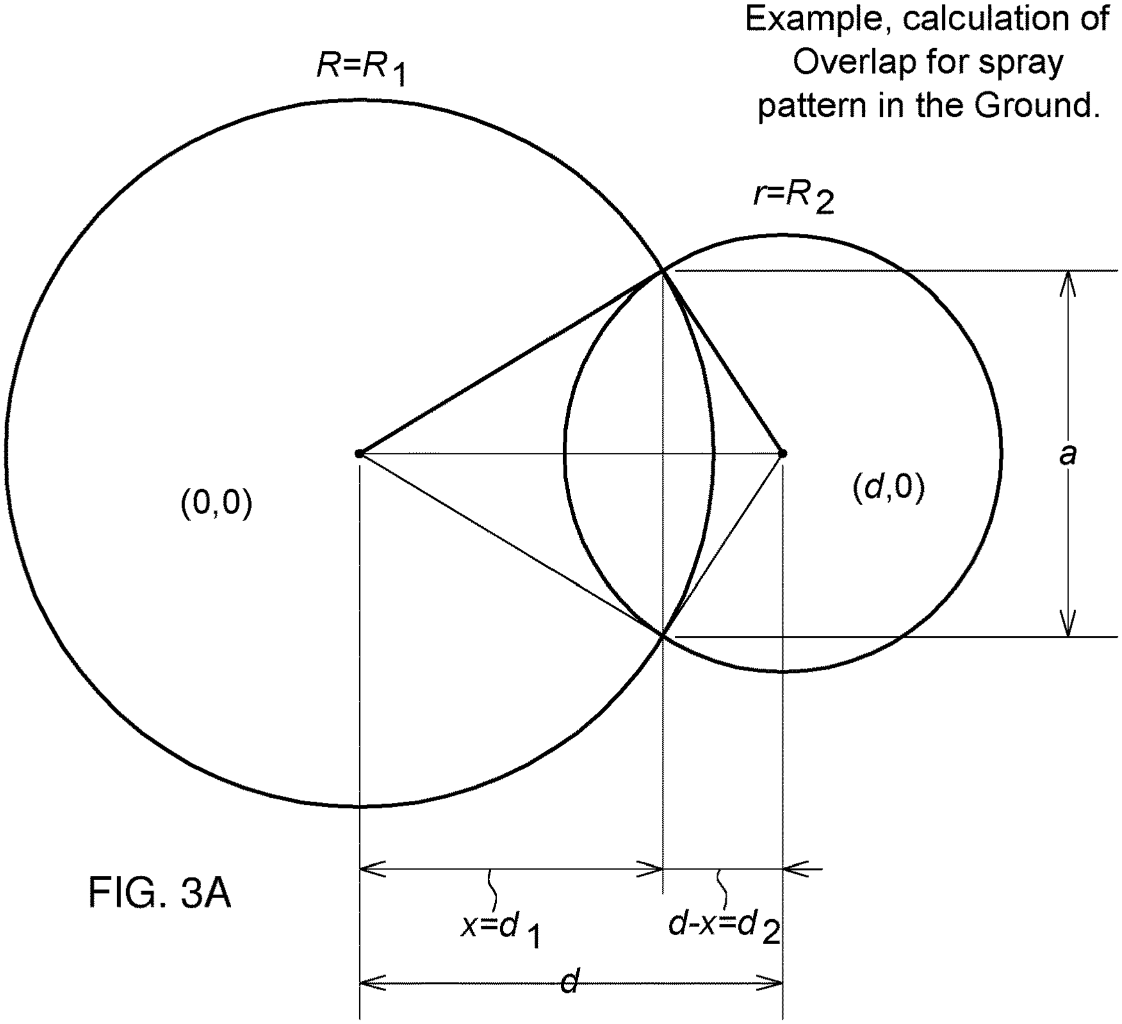
FIGS. 3A and 3B depict example nozzle spray patterns.
Figure 3B:
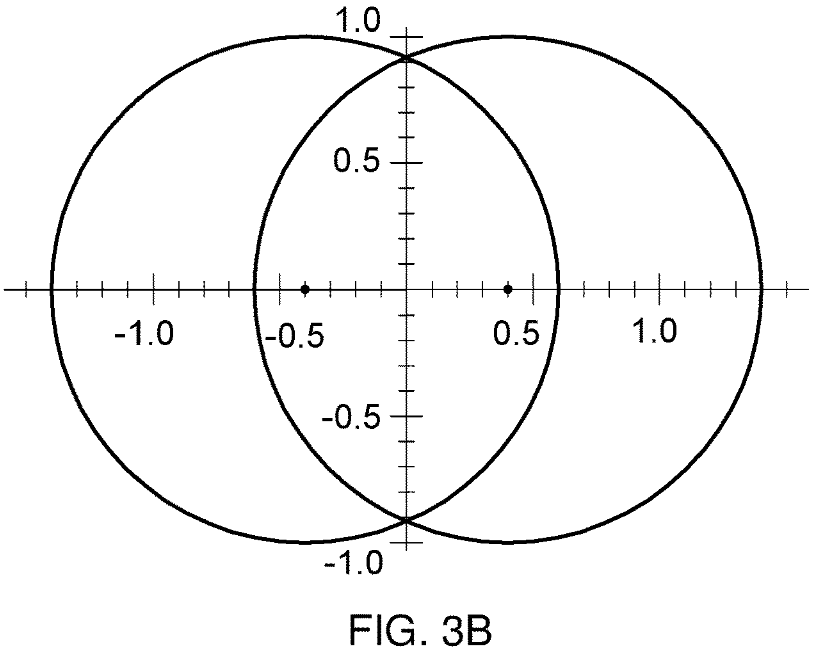
Figure 4A:
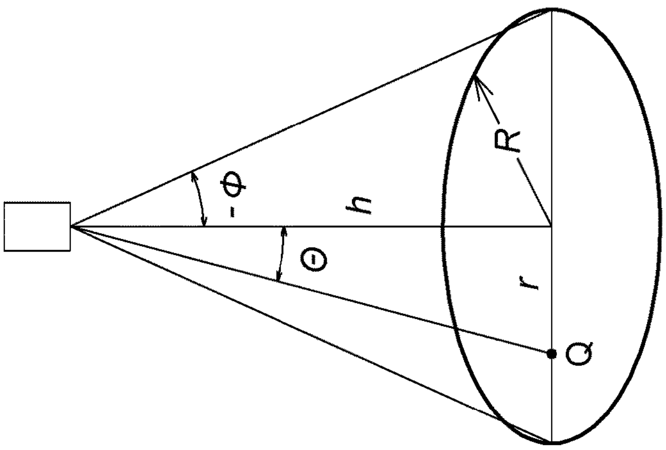
FIGS. 4A-4C depict other example nozzle spray patterns.
Figure 4C:
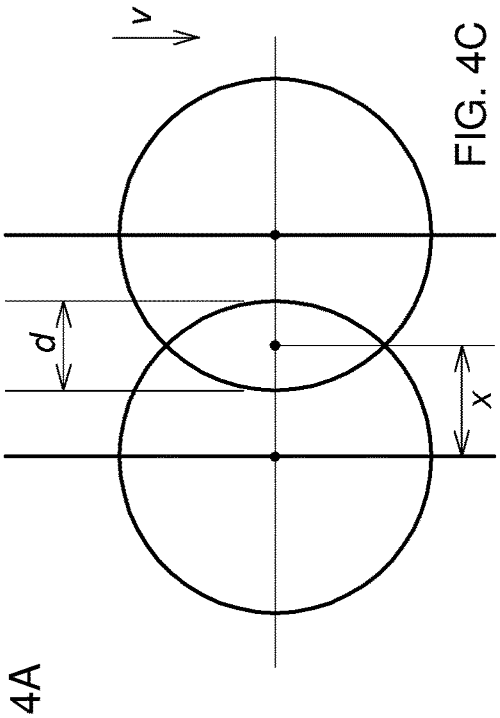
Figure 4B:
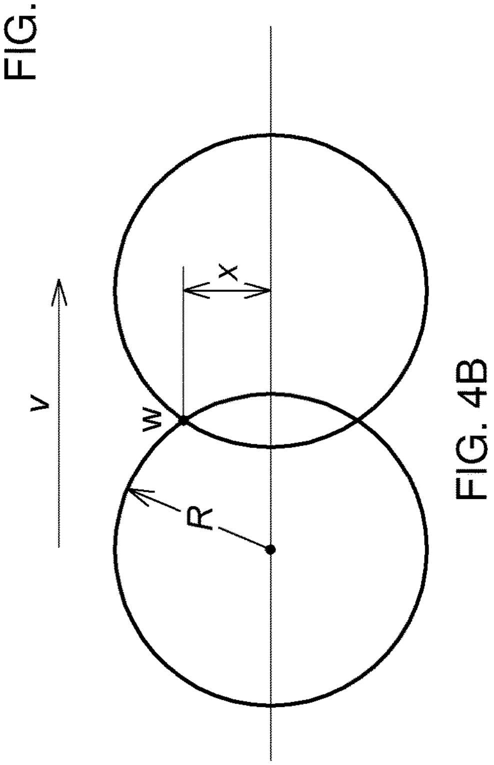
Figure 5:
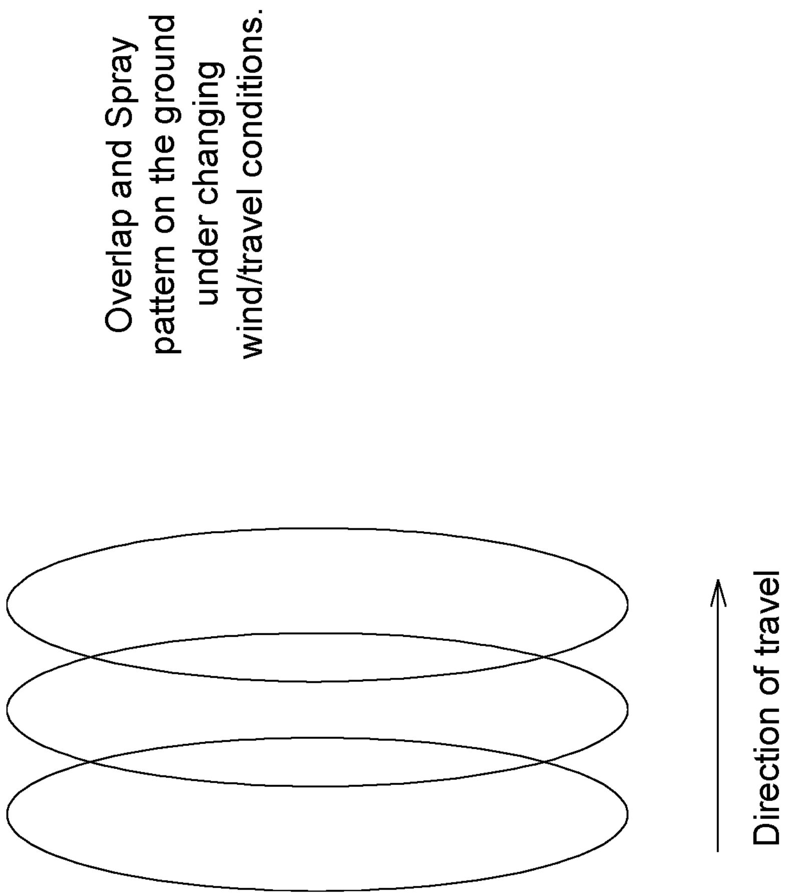
FIG. 5 depicts another example nozzle spray pattern.
Figure 6:
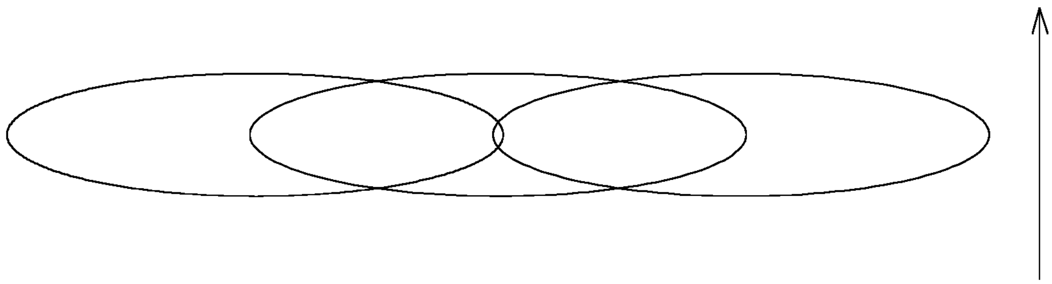
FIG. 6 depicts another example nozzle spray pattern.

With reference to FIGS. 3A and 3B, the side-to-side overlap is given by (see http://mathworld.wolfram.com/Circle-CircleIntersection.html) describes the variables R, d:

$$\begin{aligned} A &= 2R^2\cos^{-1}\left(\frac{d}{2R}\right) - \frac{1}{2}d\sqrt{4R^2 - d^2} \\ &= 2A\left(\frac{1}{2}d, R\right) \end{aligned}$$

Pulsed Spraying, Two Different Nozzle Tips Side by Side Spray Pattern:

This is still somewhat straightforward situation that may occur when the wind and direction of travel of the spray vehicle cancels each other and the nozzle operates in pulse mode. The adjacent nozzle tips have different orifices or openings. Each nozzle spray tip ejects a conical spray during the ON state (e.g. ON mode) of the pulse and the spray pattern is ejected out for the duration of the ON state and the vehicle has not traveled much during the ON state.

The side-to-side overlap is given by (see http://mathworld.wolfram.com/Circle-CircleIntersection.html) and FIGS. 3A and 3B describes the variables R, r, d:

$$
\begin{aligned}
A &= A(R, d_1) + A(r, d_2) \\
&= r^2\cos^{-1}\left(\frac{d^2 + r^2 - R^2}{2dr}\right) + R^2\cos^{-1}\left(\frac{d^2 + R^2 - r^2}{2dR}\right) - \\
&\quad \frac{1}{2}\sqrt{(-d + r + R)(d + r - R)(d - r + R)(d + r + R)}
\end{aligned}
$$

Pulsed Spraying, Ellipse Spray Pattern:

Ellipse spray patterns on the ground are more likely in reality. For example, the sprayer is traveling at 20 mph, which is effectively a 20 mile wind as seen by the spray droplets. So the cone is distorted or leaning and the planar slice of the cone parallel to the ground is approximately elliptical or a stretched circle. One embodiment of the calculation is to transform the coordinates from a vertical symmetric cone to a leaning cone and vice versa. An alternative embodiment is the slice the vertical symmetric cone at an angle so that the planar surface (representing the spray spot on the ground) of the slice is at an angle and/or tilt with respect to the surface of the ground or earth surface. There is a mathematical equation relationship between this slice angle and the wind or vehicle velocity (speed and direction). Yet another example alternative method to account for the aggregated wind/vehicle velocity on the spray drift is pictorially shown in FIG. 8A for one dimension: the fan angle is adjusted; or the original velocity of the spray droplets is vector added to the aggregated wind/vehicle velocity to obtain a final velocity of the spray droplets.

Continuous Spraying, Circular Spray Pattern:

This is akin to a spray paint situation. It includes a question whether there has been a uniform amount of spraying performed if the spray pattern is circular on the ground. To reach an optimal solution as to the travel speed and the amount of fluid dispensed, one solution is to store and use the algorithm described in "CAD-based Automated Robot Trajectory Planning for Spray Painting of Free-form Surfaces," Heping Chen, et al., Industrial Robot: An Int'l Journal Vol. 29, No. 5, pp. 426-433 (2002).

Continuous Spraying, Ellipse Spray Pattern:

A determination is made of whether there has been a uniform amount of spraying performed if the spray pattern is elliptical on the ground. To reach an optimal solution as to the travel speed and the amount of fluid dispensed, one solution is to store and use the algorithm described in "Calculating Ellipse Overlap Areas," Gary Hughes and Mohcine Chraibi (2013). Although this article provides many complicated scenarios, the two point intersection solution tends to be most applicable to the agricultural situation since the spray release is fairly constant. The wind and weather condition is also fairly constant during each hour of operation.

Boundary Problems:

This includes a one-dimensional problem, side to side, method of avoiding spraying outside the boundary. GPS, stored maps, local coordinate grid provides where the boundary of the field is. Then as for the spray pattern, it does not matter whether there is a circle or an ellipse spray pattern. Taking the "radius" R as the length of the spray pattern perpendicular to the height h, the radius of the circle or the ellipse on the ground, at distance h from the nozzle tip is given by:

$$\text{Radius } R = h \times \tan(\varphi)$$

This radius R is useful when calculating distances in one dimension so as to compare it with the distance of travel within a time T. Speed=Distance/Time may be used to compute a linear value whether the distance traveled is greater than the size of R. If the distance is greater than R, skipping occurred. Corrective action includes slowing down the vehicle or spraying longer duration (ON mode is longer) or spraying faster.

The radius R of the spray is longer or shorter depending on the wind direction relative to the direction of spray and travel. If the wind is parallel or anti-parallel to the direction of travel, radius R is its usual full length since the wind is perpendicular to R.

Rectangular Spray Pattern, New Nozzle Tips:

A toothbrush stipple pattern at the nozzle tip or rectangular spray nozzle opening is used to generate spray patterns on the ground from each nozzle that are more rectangular than elliptical. This simplifies the calculations since the overlap of rectangular areas can be determined from the four corners of the rectangle. The geometric/trigonometric equations are also simpler than ellipses and even when there is wind or vehicle velocity, the spray pattern occurring on the ground tends to remain a rectangular shape so that overlap from different nozzle sprays or spray past a desired area is readily computed. Alternatively, other nozzles tips (e.g. long elliptical patterns) generate a ground pattern that is closely approximated by a rectangular spray area on the ground so that the computation for such nozzles is simplified.

Figure 7:
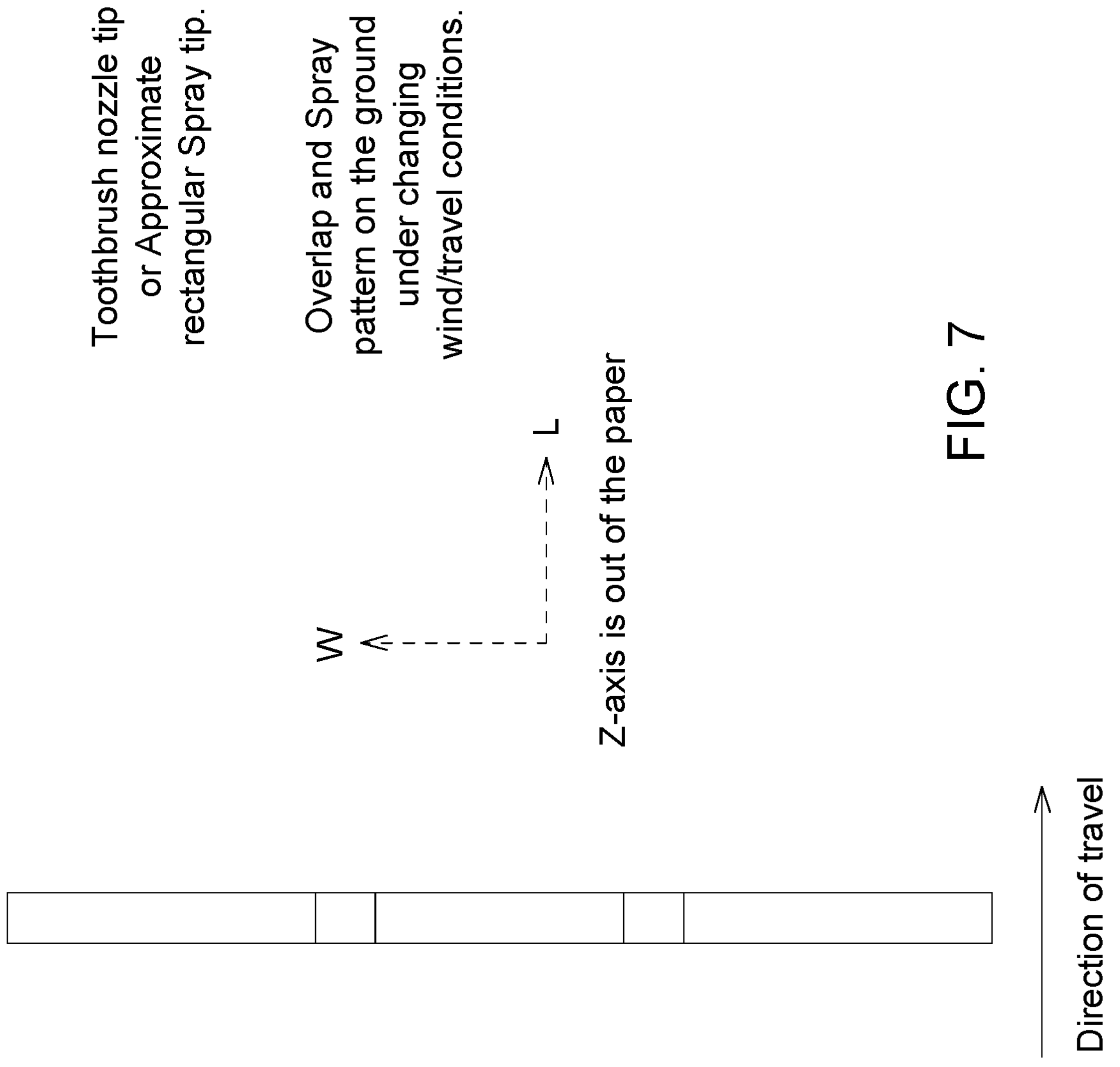
FIG. 7 depicts another example nozzle spray pattern.
Figure 8:
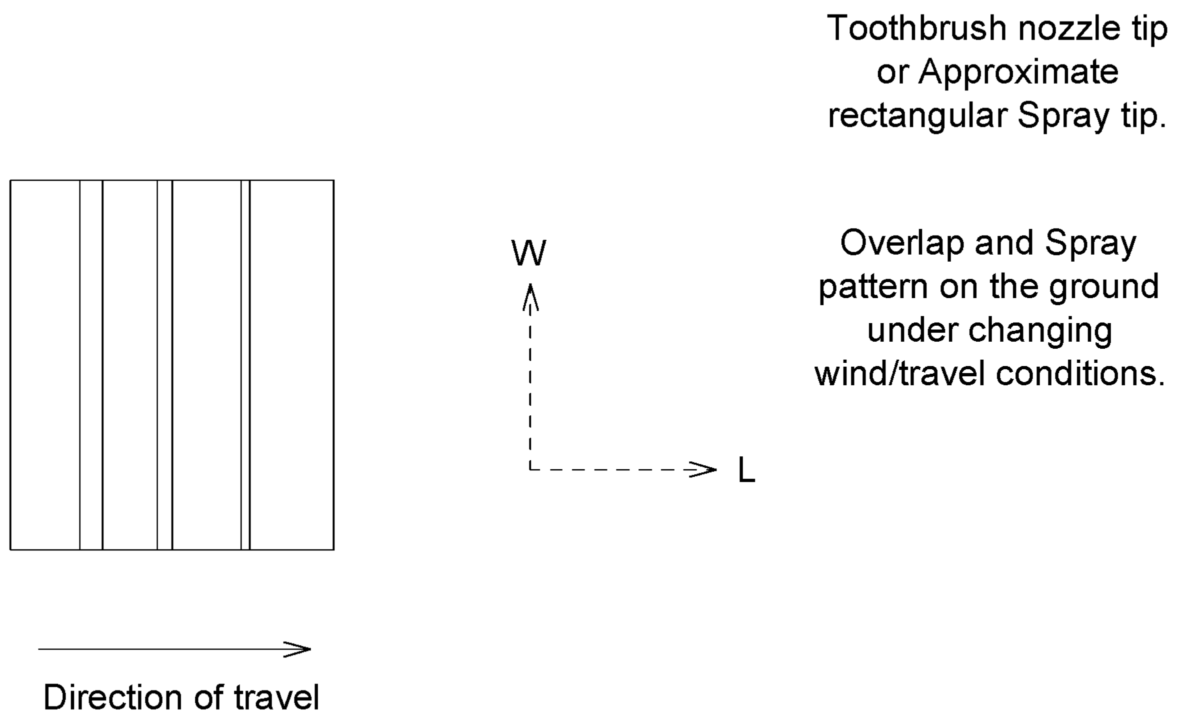
FIG. 8 depicts another example nozzle spray tip that provides a rectangular spray output pattern.

FIGS. 7 and 8 depict the pattern results of the computation for adjacent nozzles mounted on a boom of a moving vehicle. The procedure for the calculation is similar to that for the symmetric cone, but two fan angles characterizing the nozzle tip (one for the minor axis (width) and one for the major axis (length)) are stored in memory and associated with each nozzle tip. For a rectangular spray pattern, each direction (width versus length directions) may be computed independently from each other and treated like a one dimensional calculation for each variable. For example, the width W of the rectangle on the ground is obtained from W=H/tan (Angle_W), where H is the height of the nozzle from the ground and Angle_W is angle of the hypotenuse with respect to the ground. Likewise, length L of the rectangle on the ground is obtained from L=H/tan (Angle_L), where H is the height of the nozzle from the ground and Angle_L is the angle of the hypotenuse with respect to the ground. The overlap of the spray in either the W or L directions can be computed independently as well, in a one dimensional space. If W is parallel to the direction of travel, then the skipping or overlap can be computed and compared with a distance traveled D=speed of the vehicle×time duration to cover that ground distance to yield a result such as depicted in FIG. 8.

Figure 8A:
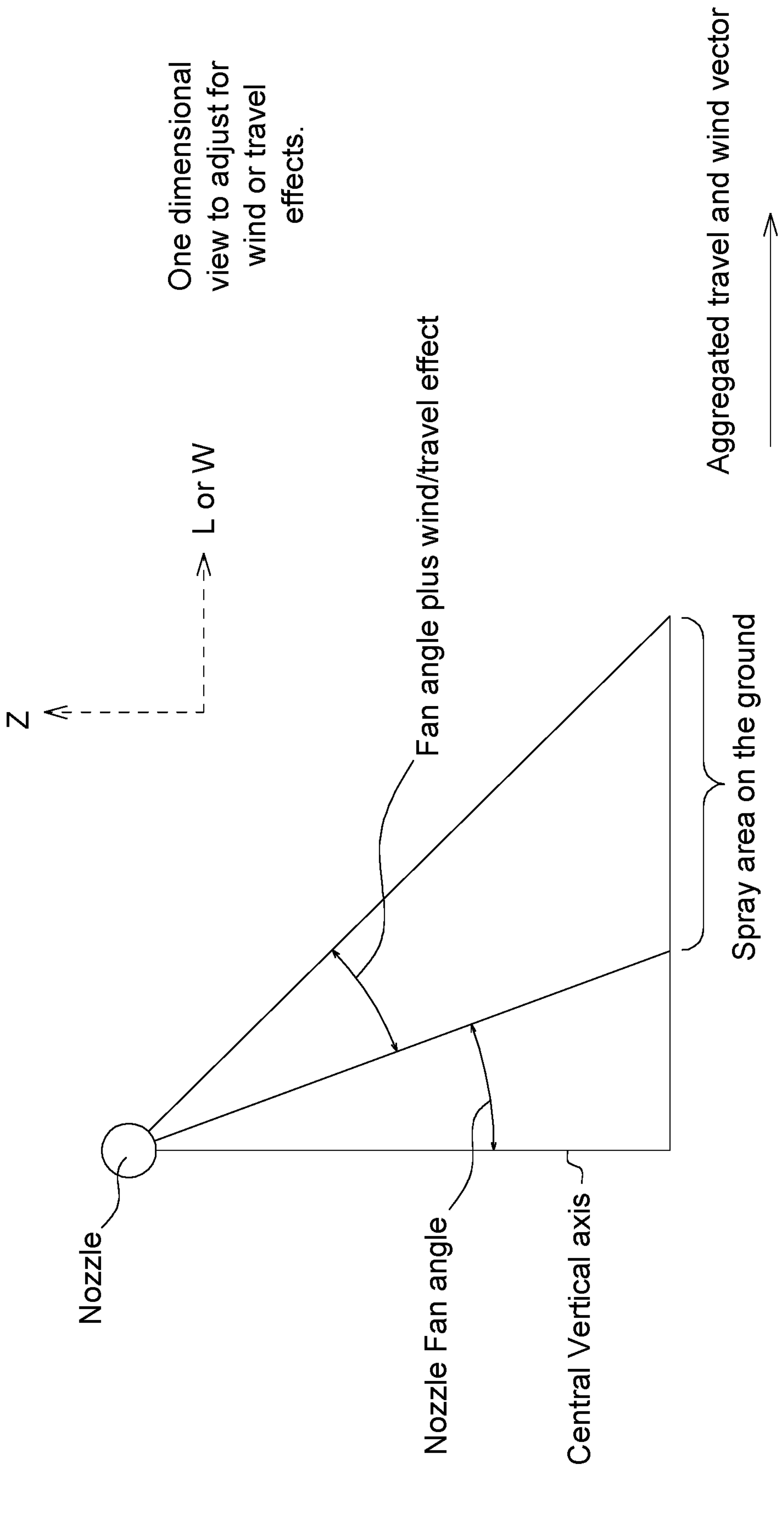
FIG. 8A depicts a pictorial representation of an example method to account for wind and travel effects.
Figure 8B:
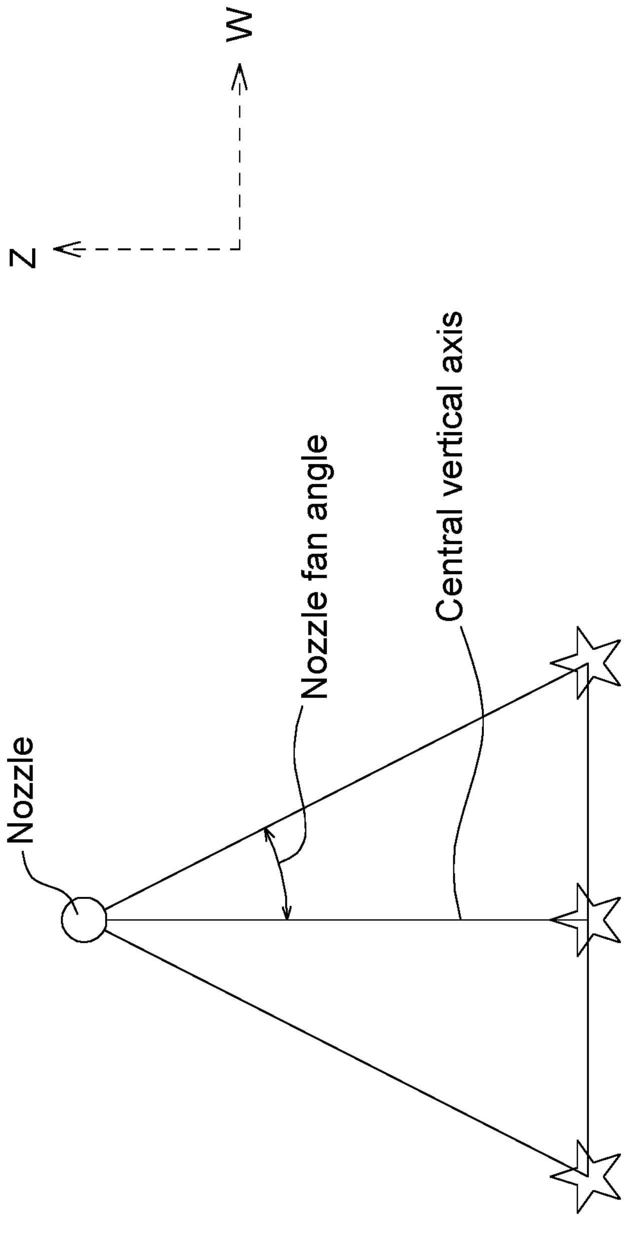
FIG. 8B depicts another pictorial representation of an example method to account for wind and travel effects.

FIG. 8A is a pictorial representation of a method to account for the vehicle travel and wind direction and speed (vector). For a rectangular approximation of a spray area on the ground that results from many types of spray nozzle tips, the aggregated wind and travel vector is calculated (broken into vectors) independently in the W and L axes or directions (VW and VL). Then the effect of each vector VW and VL is computed separately to adjust the respective fan angle of the spray nozzle in the respective W and L axes or dimensions. When the spray droplet size or the size of the granular particles are above a certain size to more or less ensure ideal spray/spread conditions, the trigonometric model provides a calculation of the dynamic spray area on the ground, along with adjustments for wind and vehicle travel vectors and a small lookup table that stores the one or more stationary (no wind/travel) fan angles of a nozzle spray tip.

In some embodiments, an air-assist system is used at the nozzle spray tips to speed up the droplets to thereby reduce the amount of drift. The air-assist system is used to increase the pressure of the fluid exiting the nozzle spray tips.

Another example method of determining the adjusted fan angle in FIG. 8A includes computing the new velocity of the spray droplet in the W and L directions. The original velocity of the spray droplets is vector added to the aggregated wind/vehicle velocity to obtain a final predicted velocity of the spray droplets (velocity is a vector (speed and direction) and vector math such as addition is performed). After obtaining the final predicted velocity of the spray droplet, then the predicted W and L distance components can be calculated (e.g. distance=speed/time duration). To simplify the computations, the shift in the velocity of the spray droplets near the ground for the particular boom height (Z axis) and at the extremities and center point of the original spray location along the W or L axis is considered. The extremities refer to center point and endpoints of the spray triangle in the W-Z or W-L plane (e.g. FIG. 8B) where the center point and endpoints are the spray points along the ground when there is no wind or vehicle travel such as when stationary nozzles are spraying when there is no wind. The center point (in the center) and endpoints are designated by the star symbols in FIG. 8B. If there are other variables (e.g. air humidity) that affect the travel of the spray droplets, parameters for the top most important variables (e.g. 2 or 3) are stored in a computer or circuit memory look up table so that a correction to the predicted travel velocity and location of the spray droplets can be made. For example, if high temperature or high humidity affects the travel speed of drifting spray droplets, then the final predicted velocity can also be multiplied down by some factor or percent value that was stored in the look up table. The local temperature or humidity is generally available either from measurement (e.g. sensor, thermometer or hygrometer mounted on the vehicle) or from a weather broadcast station. And the measured value of the local humidity is used in conjunction with the humidity factor that is stored in the look-up table to correct the predicted travel velocity of the spray droplets.

In yet another computational embodiment, the plume models or spray drift models are substituted for the trigonometric calculations described above. Such models, e.g. AGDISP, are described in various university publications or in research literature from the USDA. When combined with lookup tables, the resulting spray occurring on the ground is predicted for each individual nozzle or the nozzles on the ends and/or center of the spray boom. Then again the aggregated effect of all the nozzles is calculated and the spray areas are compared with the desired spray region. If the difference is greater than some acceptable amount (e.g. 10% or a regulation amount), then corrective actions can be taken either automatically or manually by the vehicle operator. When corrective action is taken automatically, no operator input or intervention is required to execute the corrective action. Corrective actions such as those mentioned above or depicted in the figures may be utilized.

Although much of this disclosure focuses on spray overlap among the nozzles themselves, instead of checking for overlap between the spray areas among adjacent or traveling nozzles, it is also possible to check whether the spray areas on the ground overlap with the buffer zone area or the boundary of the farm. If the ground spray area touches or extends into the buffer zone, an alert is generated by the computer to signify that there may be a problematic spray drift situation; the degree of overlap can generate different types or degrees of alarms. The graphical view (e.g. FIG. 1D) would also indicate that the spray has extended into an undesirable region, past the boundaries of the red grid.

Instead of mathematically predicting or calculating the spray pattern on the ground past the buffer zone area, a physical detection system may be used. For a rectangular spray region, the four corners of the spray regions due to the outer spray nozzle bodies can be used to determine whether spray is occurring within a desired area. For example, the outermost spray nozzles release a special detectable fluid such as fluorescent liquid or dyed liquid or some fluid that is different from the primary fluids (e.g. fertilizer) being released. The spray nozzles located on the ends of the boom breakaway wings or even the outermost boom section can release the tagged fluid. Machine vision, camera or sensors detect the back scatter or reflected light or other signals to analyze the electromagnetic or color or content spectrum of the detected signals from the tagged fluid that has traveled to the ground. As the vehicle travels, the detected signals indicate or can be used to arithmetically map out a path line for the spray fluid that has already hit the ground (e.g. “connect the dots”). When the path line crosses the boundary into the buffer zone area or territory of the farm, then the spray may be considered to have drifted into an undesirable area. Various corrective or notification indicators may occur, such as an alarm, computer alert, some spray nozzles are turned off, the fluid pressure is reduced, the boom height is lowered, and so on. Such indicators may be gradated depending on how far into the undesirable region the spray has drifted past.

In some embodiments, the processor can store and reference the data from previous passes through a field and adjust the flow rate and other factors accordingly. For example, if on a first pass across the field, drift occurs into the area that will be covered by a second pass across the field, the processor can reduce the flow or turn off some of the nozzles adjacent the first pass when the vehicle makes the second pass to avoid over-treating any portion of the field.

Finally, the orientation and directions stated and illustrated in this disclosure should not be taken as limiting. Many of the orientations stated in this disclosure and claims are with reference to the direction of travel of the equipment. But, the directions, e.g. “behind” can also be merely illustrative and do not orient the embodiments absolutely in space. That is, a structure manufactured on its “side” or “bottom” is merely an arbitrary orientation in space that has no absolute direction. Also, in actual usage, for example, the nozzles and boom equipment may be operated or positioned at an angle because the implements may move in many directions on a hill; and then, “top” is pointing to the “side.” Thus, the stated directions in this application may be arbitrary designations.

In the present disclosure, the descriptions and example embodiments should not be viewed as limiting. Rather, there are variations and modifications that may be made without departing from the scope of the appended claims. For example, although the region behind the spray vehicle was discussed in this disclosure, spray drifting towards the region ahead of the boom or vehicle would be addressed similarly.

What is claimed is:

1. A method of dispersing fluids or fine granular particles from an agricultural vehicle, the method comprising:

dispensing the fluids or fine granular particles through a first nozzle and a second nozzle;

sensing at least one of the following: vehicle travel speed, vehicle travel direction, wind speed, wind direction, a first height of the first nozzle from a ground surface, and a second height of the second nozzle from the ground surface;

computing, with a processor, a first spray pattern on the ground surface based on an expected fan angle from a look-up table having fan angles of the first and second nozzles of fluids or fine granular particles dispensed through the first nozzle, and at least one of the following: the sensed vehicle travel speed, the sensed vehicle travel direction, the sensed wind speed, the sensed wind direction, and the sensed height of the first nozzle from the ground surface;

computing, with the processor, a second spray pattern on the ground surface based on an expected angle from the look-up table having fan angles of the first and second nozzles of fluid or fine granular particles dispensed through the second nozzle, and at least one of the following: the sensed vehicle travel speed, the sensed vehicle travel direction, the sensed wind speed, the sensed wind direction, and the sensed height of the second nozzle from the ground surface;

determining, with the processor, an overlap region between the first spray pattern and the second spray pattern;

comparing, with the processor, the determined overlap region with a pre-determined overlap;

taking corrective action automatically by performing at least one of the following actions with the processor: changing the vehicle travel speed, changing a duration of time the fluids or fine granular particles are dispensed from at least one of the first nozzle and the second nozzle, adjusting a pointing direction of at least one of the first and second spray nozzles, and turning off at least one of the first and second spray nozzles;

storing at least two weather correction factors in a memory look-up table;

measuring at least two weather values associated with the weather correction factors; and determining, with the processor, a velocity of spray droplets at extremities of a stationary spray release cone based upon the stored weather correction factors and the measured weather values.

2. The method of claim 1, wherein the first and second nozzles are positioned on a boom coupled to the agricultural vehicle, the method further comprising:

storing a fan angle of the first and second nozzles in a computer memory look-up table; and associating a major axis fan angle and a minor axis fan angle for at least one of the first nozzle and the second nozzle in the computer memory look-up table.

3. The method of claim 1, further comprising predicting, with the processor, a stationary velocity of the spray droplets based on at least one of the vehicle travel speed, the vehicle travel direction, the wind speed, and the wind direction to obtain a final predicted velocity.

4. The method of claim 3, further comprising:

calculating, with the processor, the final predicted velocity based on the at least two weather correction factors; and computing, with the processor, a predicted location of the spray droplets on the ground surface.

5. The method of claim 4, further comprising:

comparing, with the processor, the predicted location on the ground surface with a field boundary location; and taking corrective action by performing at least one of the following with the processor: adjusting a pointing direction of the at least one of the first nozzle and the second nozzle, turning off at least one of the first nozzle and the second nozzle, adjusting a height of a boom, altering spray pressure, and sending an alert to the operator.

6. The method of claim 2, further comprising:

using a pre-determined spray droplet drift model;

measuring at least two weather values and inputting the at least two measured weather values into the spray droplet drift model; and computing, with the processor, a predicted location of the spray droplets on the ground.

7. The method of claim 6, further comprising comparing, with the processor, the predicted location of the spray droplets on the ground with a field boundary location.

8. The method of claim 7, wherein taking corrective action further includes performing at least one of the following actions: adjusting a pointing direction of at least one of the first and second spray nozzles, turning off at least one of the first and second spray nozzles, adjusting a height of the boom, and altering spray pressure.

* * * * *